US009616380B2

(12) United States Patent
Helin

(10) Patent No.: US 9,616,380 B2
(45) Date of Patent: Apr. 11, 2017

(54) SORPTION DRYING SYSTEM

(71) Applicant: CTT SYSTEMS AB, Nyköping (SE)

(72) Inventor: Robert Helin, Södertälje (SE)

(73) Assignee: CTT Systems AB, Nykoping (SE)

( * ) Notice: Subject to any disclaimer, the term of this patent is extended or adjusted under 35 U.S.C. 154(b) by 9 days.

(21) Appl. No.: 14/411,639

(22) PCT Filed: Jul. 1, 2013

(86) PCT No.: PCT/SE2013/050843
§ 371 (c)(1),
(2) Date: Dec. 29, 2014

(87) PCT Pub. No.: WO2014/003683
PCT Pub. Date: Jan. 3, 2014

(65) Prior Publication Data
US 2015/0165371 A1    Jun. 18, 2015

(30) Foreign Application Priority Data

Jun. 29, 2012   (SE) .................................. 1250744-8

(51) Int. Cl.
*B01D 53/06* (2006.01)
*B01D 53/26* (2006.01)
*F24F 3/14* (2006.01)

(52) U.S. Cl.
CPC .......... *B01D 53/261* (2013.01); *B01D 53/06* (2013.01); *F24F 3/1405* (2013.01);
(Continued)

(58) Field of Classification Search
CPC ................. B01D 53/06; B01D 53/261; B01D 2253/106; B01D 2253/108;
(Continued)

(56) References Cited

U.S. PATENT DOCUMENTS 4,391,616 A  *  7/1983  Imamura ............. B01D 53/261
                                                  55/527
4,701,189 A    10/1987  Oliker
(Continued)

FOREIGN PATENT DOCUMENTS

WO   WO0074819 A1   12/2000

OTHER PUBLICATIONS

European Patent Office (ISA/EP), International Search Report from PCT/SE2013/050843 as completed Nov. 5, 2013 (3 pgs.).
European Patent Office (ISA/EP), International Preliminary Report on Patentability from PCT/SE2013/050843 as completed Nov. 5, 2013 (16 pgs.).

*Primary Examiner* — Frank Lawrence
(74) *Attorney, Agent, or Firm* — Barclay Damon, LLP

(57) ABSTRACT

Sorption drying system for dehumidification of a moist gas stream, comprising a mass (1) of absorbing material, a moist gas stream (2) arranged to flow through at least a part of the absorbent mass, and a heated stream of regeneration gas (3) arranged to flow through at least a part of the absorbent mass. The sorption drying system further comprises means (4) for deflecting a part of the dehumidified gas stream after flowing through the absorbent mass, a cooler (5) for cooling the deflected dehumidified gas stream, and means (6; 7) for returning the cooled deflected dehumidified gas stream to the moist gas stream at the inlet into the absorbent mass. At least a part of the cooled deflected dehumidified gas stream is arranged to flow through the absorbent mass in a channel separated from the moist gas stream.

10 Claims, 5 Drawing Sheets

(52) U.S. Cl.
CPC ...... *F24F 3/1423* (2013.01); *B01D 2253/106* (2013.01); *B01D 2253/108* (2013.01); *B01D 2257/502* (2013.01); *B01D 2257/504* (2013.01); *B01D 2257/708* (2013.01); *B01D 2257/80* (2013.01); *B01D 2259/40088* (2013.01); *F24F 2203/1016* (2013.01); *F24F 2203/1032* (2013.01); *Y02C 10/08* (2013.01)

(58) Field of Classification Search
CPC ........ B01D 2257/502; B01D 2257/504; B01D 2257/708; B01D 2257/80; B01D 2259/40088; Y02C 10/08; F24F 3/1405; F24F 3/1423; F24F 2203/1016; F24F 2203/1032
USPC ...... 95/113–115, 117, 123, 125; 96/116, 125
See application file for complete search history.

(56) References Cited

U.S. PATENT DOCUMENTS

| | | | | |
|---|---|---|---|---|
| 5,242,473 | A | * | 9/1993 | Ogasahara ............. B01D 53/06 96/125 |
| 5,512,083 | A | * | 4/1996 | Dunne ................... B01D 53/06 95/113 |
| 5,701,762 | A | * | 12/1997 | Akamatsu ............. B01D 53/06 62/636 |
| 5,891,219 | A | * | 4/1999 | Klobucar ............... B01D 53/06 95/113 |
| 7,207,123 | B2 | * | 4/2007 | Tanahashi ............. B01D 53/06 34/80 |
| 2005/0150378 | A1 | | 7/2005 | Dunne et al. |
| 2005/0217481 | A1 | | 10/2005 | Dunne et al. |
| 2012/0068119 | A1 | * | 3/2012 | Kametani ............. B01D 53/06 252/372 |

* cited by examiner

SORPTION DRYING SYSTEM

CROSS-REFERENCE TO RELATED APPLICATIONS

This application is a national stage application under 35 U.S.C. §371 of PCT/SE2013/050843 filed Jul. 1, 2013, which claims priority of SE 1250744-8, filed Jun. 29, 2012, each of these documents being hereby incorporated by reference in their entirety.

The present invention concerns a sorption drying system for dehumidification of a moist gas stream comprising a mass of absorbing material, a moist gas stream arranged to flow through at least a part of the absorbent mass, and a heated stream of regeneration gas arranged to flow through at least a part of the absorbent mass. In a second aspect, the present invention concerns a method for dehumidification of a moist gas stream in such a sorption drying system comprising a mass of absorbing material.

TECHNICAL BACKGROUND OF THE INVENTION

Systems for dehumidification or drying of moist gas streams are known since long. Examples of such systems are found in, among others, U.S. Pat. No. 4,701,189 and US 2005/0235827, which disclose rotary drying wheels. The drying wheel contains a mass of absorbing or sorptive material (drying agent) that removes moisture from the gas stream by the vapour being absorbed. The moisture is picked up in the drying agent and the dry gas stream is forwarded for the use in a process or the like. After a prolonged dehumidification, the drying agent will be saturated with moisture, and therefore it is required that the moisture has to be driven out of the drying agent for enabling the drying to proceed. This is usually made by regeneration, i.e., that a heated gas stream passes through the drying wheel in an area separated from the passage of the moist gas stream. The heated air regenerates the drying wheel continuously, which thereby gives a continuous drying of the moist gas stream.

A problem of such drying wheels is that, upon absorption of vapour, latent heat in the gas stream is converted into sensible heat, i.e., the evaporation energy in absorption increases the temperature of the gas and drying agent, which impairs its absorption capacity. Likewise, also the regeneration increases the temperature of the drying wheel.

US 2011/0132191 and US 2012/0125198 disclose proposals of solutions wherein a separate gas stream for the cooling of the absorbing drying agent flows through the drying wheel in a delimited zone or sector separated from the main flow of the gas to be dried and the regeneration flow. Disadvantages of these solutions are that they require an additional flow for the cooling gas with associated equipment and that the available sector for the drying of the gas in the main flow is reduced, which impairs the capacity of the drying wheel. Another disadvantage is that the cooling sector only cools the drying agent in the beginning of its revolution; during the remaining part of the revolution, the drying agent is heated during the absorption.

JP 60-102919 discloses a system for dehumidification of air with high air humidity using a dehumidifying rotor, wherein a part of a dehumidified air stream is passed through a heat exchanger rotor that lowers its temperature, whereupon a part of this dehumidified cooled air is mixed with moist air in order to lower the air humidity of the incoming air that then is sent to the dehumidifying rotor. A disadvantage of this system is that the cooled air does not essentially contribute to the lowering of the temperature of the rotor. Therefore, there is a need of developing systems and methods for improving the performance of sorption dryers, particularly for high air humidities.

SUMMARY OF THE INVENTION

The object of the present invention is to provide systems and methods for improving the performance of sorption dryers.

This is achieved by a sorption drying system for dehumidification of a moist gas stream according to claim 1, comprising a mass of absorbing material, a moist gas stream arranged to flow through at least a part of the absorbent mass, and a heated stream of regeneration gas arranged to flow through at least a part of the absorbent mass. The sorption drying system further comprises means for deflecting a part of the dehumidified gas stream after flowing through the absorbent mass, a cooler for cooling the deflected dehumidified gas stream, and means for returning the cooled deflected dehumidified gas stream to the inlet into the absorbent mass, at least a part of the cooled deflected dehumidified gas stream being arranged to flow through the absorbent mass in a channel separated from the moist gas stream.

By reusing a part of the already dehumidified gas stream that has been cooled to lower the temperature in the absorbent mass, a lower, more optimal temperature for dehumidification is attained, where the absorbent mass more efficiently absorbs the moisture in the gas stream. Simultaneously, the advantage is achieved that the supplied cooled gas stream contributes with less additional moisture, since it is already partly dehumidified. If the balance between cooled deflected dehumidified gas and moist gas is optimized, the drying performance is increased in spite of the fact that flow rates of the gas(-es) through the absorbent mass may differ and/or be elevated. By separating at least a part of the cooled deflected dehumidified gas stream from the moist gas stream, a controlled recirculation or return of the cooled deflected dehumidified gas stream is achieved. This means that the flow rate or the air flow of the cooled dehumidified gas stream can be increased so that it efficiently cools down the absorbent mass.

In another embodiment, deflection of the dehumidified gas stream occurs from an area on the outlet side of the absorbent mass that essentially corresponds to the area on the inlet side of the absorbent mass toward which the moist gas stream is directed. This means that the dehumidified gas stream is deflected from an area of the absorbent mass that is humidity-saturated to a higher degree than the other areas, which impairs its absorption capacity. Then the part of the dehumidified gas stream that is allowed to pass without deflection comes from areas of lower degree of saturation, and thereby better absorption capacity, which gives an improved drying performance of the sorption drying system.

In an alternative embodiment, the cooled dehumidified gas stream flows through the absorbent mass in a channel separated from the moist gas stream by means of seals.

In a preferred embodiment, the means for deflection comprises a fan or pump situated between the outlet of the dehumidified gas stream from the absorbent mass and the cooler.

In an alternative embodiment, the means for deflection comprises a fan situated between the cooler and the inlet of the moist gas stream into the absorbent mass.

In another preferred embodiment, the absorbent mass essentially is in the form of a disc or rotor and is adapted to rotate about a central axis, the moist gas stream being adapted to flow through a first channel in the disc and the stream of regeneration gas being adapted to flow through a second channel in the disc, separated from the first channel by means of seals, and the channels essentially having the shape of circular sectors.

In an alternative embodiment, deflection of the dehumidified gas stream occurs in a partial circular sector situated essentially immediately after the circular sector of the stream of regeneration gas in the direction of rotation of the absorbent disc. Alternatively, deflection of the dehumidified gas stream occurs in a partial circular sector situated essentially immediately before the circular sector of the stream of regeneration gas in the direction of rotation of the absorbent disc. Preferably, deflection occurs by a combination from both partial circular sectors.

In another embodiment, the sorption drying system comprises a valve situated at the outlet of the stream of regeneration gas from the absorbent mass for regulating the pressure of the stream of regeneration gas.

In a preferred embodiment, the sorption drying system comprises a fan for varying the flow of the stream of regeneration gas through the absorbent mass.

In an alternative embodiment, the parts of the drying system that comprise the absorbent mass and its seals are built-in in an air-proof shell.

In a second aspect, the present invention concerns a method for dehumidification of a gas stream in a sorption drying system comprising a mass of absorbing material, wherein the method comprises the steps of:

flowing through at least a part of the absorbent mass by a moist gas stream; and flowing through at least a part of the absorbent mass by a heated stream of regeneration gas;

deflecting a part of the dehumidified gas stream after flowing through the absorbent mass;

cooling the deflected dehumidified gas stream; and returning the cooled deflected dehumidified gas stream to the moist gas stream at the inlet into the absorbent mass.

Preferred embodiments of the method comprise features corresponding to the features of the sorption drying system.

In a preferred embodiment, the method comprises the step of regulating the pressure of the stream of regeneration gas in such a way that this is essentially equal to, however always lower than, the pressure of the moist gas stream.

DETAILED DESCRIPTION OF THE INVENTION

Below, the sorption drying system will be described more in detail, reference being made to the figures. However, the invention should not be considered limited to the embodiment or embodiments shown in the figures and described below, but may be varied within the scope of the claims.

The concepts "drying" and "dehumidification" may be interpreted in a strict way as a process to remove water from an air stream or gas stream. In the present description, however, the concepts should be interpreted in a wider meaning to remove or separate an absorbable and/or condensable component from an air stream or gas stream. Examples of such components that fall within the scope of the present invention are volatile organic compounds (VOCs), carbon dioxide, and/or carbon monoxide. The invention is, however, not limited to these.

Figure 1:
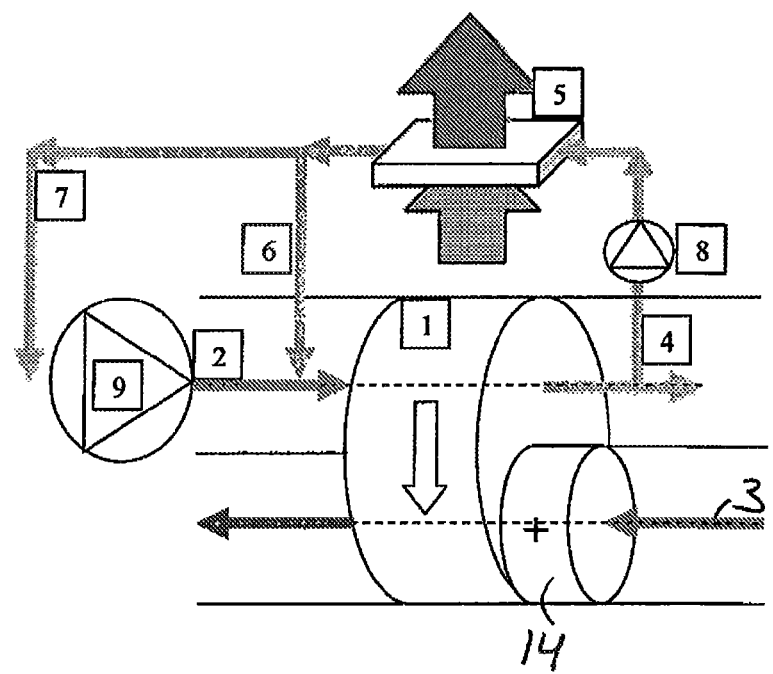
FIG. 1 shows in a schematic view a sorption drying system having a cooled recirculation flow according to the present invention.

FIG. 1 shows a schematic illustration of a sorption drying system according to the present invention. A mass 1 of absorbing or sorptive material is adapted to be flowed through by a moist gas stream 2 to be dehumidified. Preferably, the absorbent mass 1 is adapted to rotate in the direction of the arrow, thereby being a rotor dryer. In an alternative embodiment of the invention, the absorbent mass 1 is part of a column dryer having a stationary absorbent mass 1 that is flowed through by a moist gas stream. In the following, the description will be directed to a rotary absorbent mass 1, a so-called drying wheel or rotor dryer. The corresponding features are, however, also applicable to a column dryer, which in the cooling of absorbent mass also is embraced by the present invention. The cooling may be carried out according to the same recirculating principle, but also by alternative cooling methods wherein the temperature rise of the absorbent mass is counteracted, for instance by a cooling coil in the absorbent mass or an air stream that passes the column or the tube without physical contact, similar to a cross flow heat exchanger with thermal contact.

The absorbing material comprises silica gel, molecular sieves (also called mol sieves), zeolites, or a combination of the same. The absorption material is, however, not limited to these, but also other suitable absorbents are feasible. In a preferred embodiment, the sorptive material and its absorption capacity is adapted according to the change of the relative humidity of the moist gas stream in the direction of the gas stream through the absorbent mass 1. The temperature increases and the relative air humidity decreases with the distance from the inlet to the absorbent mass 1. For instance, the absorbent mass may comprise silica gel ($SiO_2$) near the inlet and mol sieve near the outlet.

During the throughflow of the absorbent mass 1, the moist gas stream 2 will be dehumidified by absorption, after which a dehumidified gas stream flows out of the absorbent mass on the other side.

For the regeneration of the absorbent mass 1, i.e., drive out the moisture from the absorbent mass, a stream of regeneration gas 3 is arranged to flow through the absorbent mass in the opposite direction of the moist gas stream. It is also within the scope of the invention that the stream of regeneration gas 3 flows through the absorbent mass 1 in the same the direction as the moist gas stream. In case the sorption drying system comprises a column dryer with stationary absorbent mass 1, the same is flowed through alternately by a moist gas stream for dehumidification and a stream of regeneration gas to drive out the moisture from the absorbent mass 1.

The stream of regeneration gas 3 is heated by a heater 14 that may be placed in direct connection to the absorbent mass 1. It is also feasible that the heater 14 is situated further from the absorbent mass 1, or that the stream of regeneration gas 3 is heated in another way, for instance by the use of a waste heat from a process wherein the sorption drying system is included.

Figure 2:
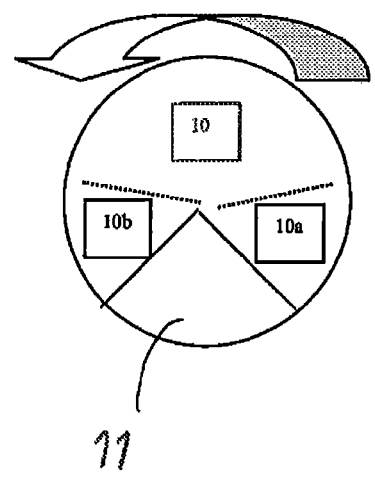
FIG. 2 shows in a schematic view an absorbent disc according to the present invention.

The absorbent mass 1 is preferably formed as a disc or rotor wherein channels or passages 10, 11 for the moist gas stream and the stream of regeneration gas 3 occupy different, separated circular sectors, which is illustrated in FIG. 2. The channels 10, 11 are separated by means of radially arranged seals. The circular sectors 10, 11 do not define fixed channels in the disc of the absorbent mass 1, but the passage of the channels through the disc varies according to the rotation of the disc. Thus, the circular sectors 10, 11 delimit the instantaneous areas or zones of the flow of the gas streams 2, 3 into and out of the absorbent mass 1.

In order to counteract the impaired absorption capacity of the absorbent mass 1 due to heating as a consequence of moisture absorption, and in order to increase the number of passages through the absorbent mass 1, the sorption drying system comprises means 4 for deflecting a part of the dehumidified gas stream that flows out of the absorbent mass 1. The means 4 may, for instance, comprise a fan or a pump 8, 9 that sucks in a part of the dehumidified gas stream into a separate conduit or channel 4 and leads it past a cooler 5. The cooler 5 may, for instance, comprise a heat exchanger, a heat pump, water-glycol batteries, a heat pipe, or a combination of the same. The deflected dehumidified gas stream is cooled by the cooler 5, whereupon the cooled dehumidified air is returned to the moist gas stream at its inlet into the absorbent mass 1 via a conduit 6, 7. Thus, a cooled recirculation flow is formed that efficiently cools the absorbent mass 1 without the supply of a separate cooling gas in a separate circular sector of the absorbent mass 1.

Another advantage that is achieved is that the heat taken from the deflected dehumidified gas stream may be used to preheat the stream of regeneration gas 3.

The fan 8, 9 that deflects a part of the dehumidified gas stream may, for instance, be situated between the outlet of the dehumidified gas stream from the rotary absorbent mass and the cooler 5, and/or between the cooler 5 and the inlet of the moist gas stream into the rotary absorbent mass. In the latter case, the cooled dehumidified air may advantageously be directed to the intake of the fan 9, so as to then be supplied to the inlet of the absorbent mass 1 for the moist gas stream 2. It is then possible to get along without the fan 8 depending on available pressures and desired flow in the deflected gas stream.

Preferably, the deflected dehumidified air is taken from an area or partial circular sector wherein the air is most moist. It may be from a partial circular sector 10a essentially immediately after the circular sector of the stream of regeneration gas 3 in the direction of rotation of the disc, when the absorbent mass 1 is warm and possibly moist. Another alternative is to deflect the air from a partial circular sector 10b essentially immediately before the circular sector of the stream of regeneration gas 3 in the direction of rotation of the disc, when the absorbent mass 1 is to a higher degree humidity-saturated than in the other areas of the disc. It is also within the scope of the invention to combine deflection of a dehumidified gas stream from both the previously described partial circular sectors. The part of the dehumidified gas stream that is driest, i.e., from the partial circular sector 10 between the two above-mentioned partial circular sectors 10a, 10b, is allowed to proceed through the sorption drying system without deflection.

The deflection sectors may be delimited and separated by means of rigid seals, but may also be made without rigid seals, the air being deflected in the vicinity of the two moist partial circular sectors 10a, 10b described above by a negative pressure formed by the fan 8, 9 in the conduit 4 that leads to the cooler 5.

For reducing the energy consumption of the sorption drying system, the heater power, the heater flow, the rotor speed, the cooled recirculation flow, and its cooling may be adapted based on the current dehumidification need. This can be made with knowledge about flows, inlet moist, and target moist of the dry air. A simpler variant of this is a temperature sensor at the inlet, when it is known that the air does not have higher air humidity than what the temperature allows, since the heater power of the dehumidifier, the heater flow, rotor speed, the cooled recirculation flow, and its cooling are controlled based on knowledge about its performance under different conditions. A temperature sensor is cheaper and more stable than a moist sensor.

Another problem that arises in the sorption drying system is leakage between the moist gas stream and the stream of regeneration gas 3 since the seals that define and separate the channels of the gas streams are not absolutely tight. This leakage between the gas streams results in inferior dehumidification if the air from the regeneration flow for example leaks over to the dry air flow. Occasionally, the gas composition between the different flows may be in such a way that the leakage has to be controlled. Occasionally, the pressure ratios may in addition be variable because of connected equipment in channels and changed flows.

Figure 3:
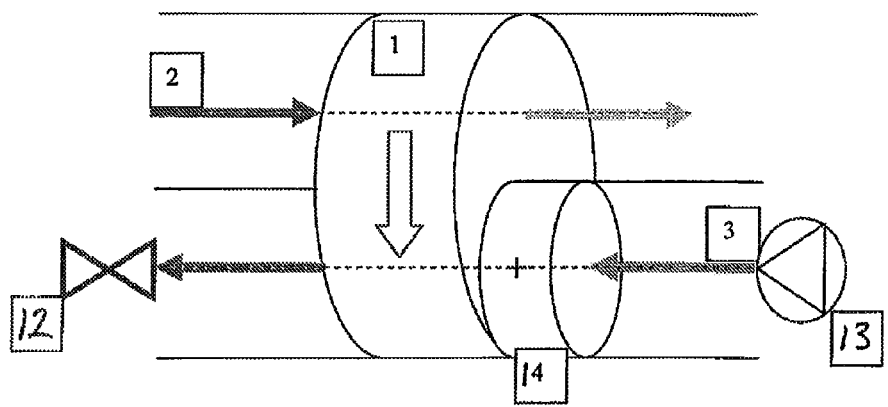
FIG. 3 shows in a schematic view a sorption drying system with regulated gas stream pressure according to the present invention.

A solution to this problem is to actively monitor and regulate the pressure of the stream of regeneration gas 3 and/or the moist gas stream 2 to counteract the leakage. The pressure of the gas streams is measured by means of suitable pressure transducers or gauges deployed in the flow of the respective gas stream through the sorption drying system. FIG. 3 shows a valve 12, arranged at or connecting to, for instance, the outlet of the stream of regeneration gas 3 from the absorbent mass that is adapted to regulate the pressure of the stream of regeneration gas 3 by adjusting the pressure drop through the valve 12. It is also within the scope of the present invention that the valve 12 is arranged at the inlet of the stream of regeneration gas 3 into the absorbent mass 1. The pressure of the stream of regeneration gas 3 is then regulated in such a way that it always is a little lower than the pressure of the moist gas stream. In other words, the valve 12 creates precisely so much pressure in the stream of regeneration gas 3 so that its pressure is essentially equal to the pressure of the moist gas stream, however always lower. Thereby, leakage from the stream of regeneration gas 3 to the moist gas stream is prevented, at the same time as leakage in the opposite direction is minimized. The reason for a certain leakage being allowed from the moist gas stream to the stream of regeneration gas 3, but not vice versa, is that the air humidity of the dry air is not increased; alternatively that air from the regeneration side does not contaminate the dry air with its composition.

Because of the activity of the valve 12, the flow of the stream of regeneration gas 3 is affected. Therefore, the flow may need to be adjusted, for instance by means of a regulated fan 13.

Another further problem that may arise is that a required rise of the pressures in the gas streams causes leakage through the peripheral seals of the sorption drying system. In a preferred embodiment, the part of the drying system that comprises the rotary absorbent mass 1 and its seals is built-in in an air-proof shell (not shown), inside which the leakage air builds up a pressure that makes the leakage to stop or be minimized. Moreover, should the occasion arise, when the leakage inside the shell passes further into the other air stream, it passes in a controlled way in the correct direction (as a consequence of the pressure control by the valve system). This construction eliminates losses out from the drying system.

Figure 4:
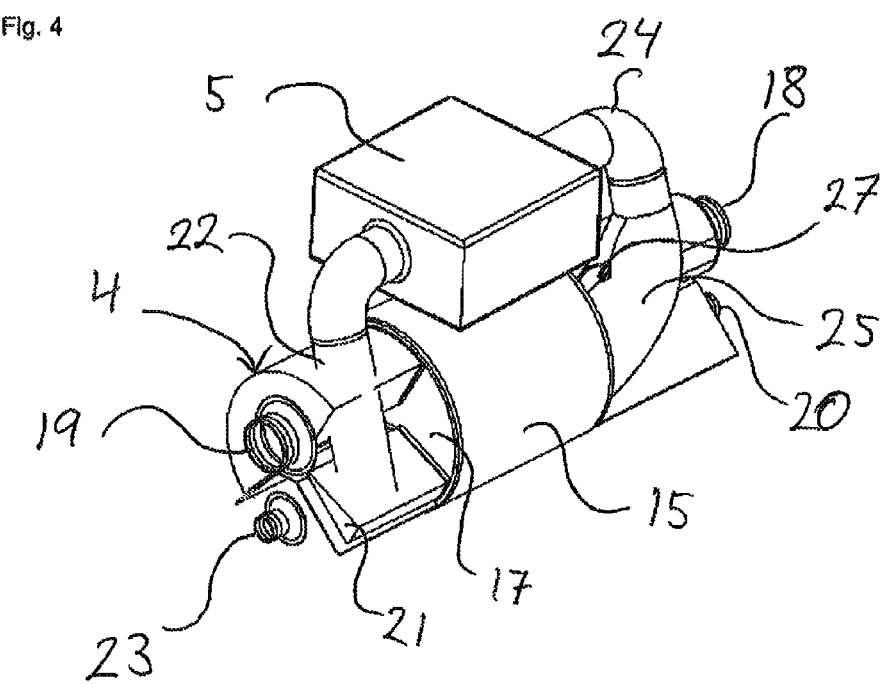
FIG. 4 shows in a perspective view a sorption drying system having a cooler according to a first embodiment of the present invention.
Figure 5:
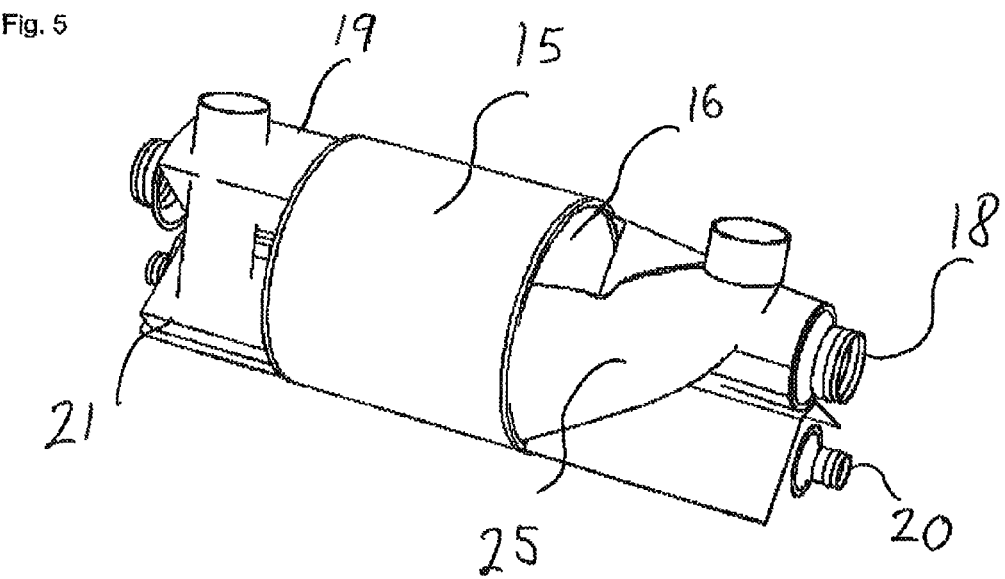
FIG. 5 shows in a perspective view a sorption drying system according to a first embodiment of the present invention.
Figure 6:
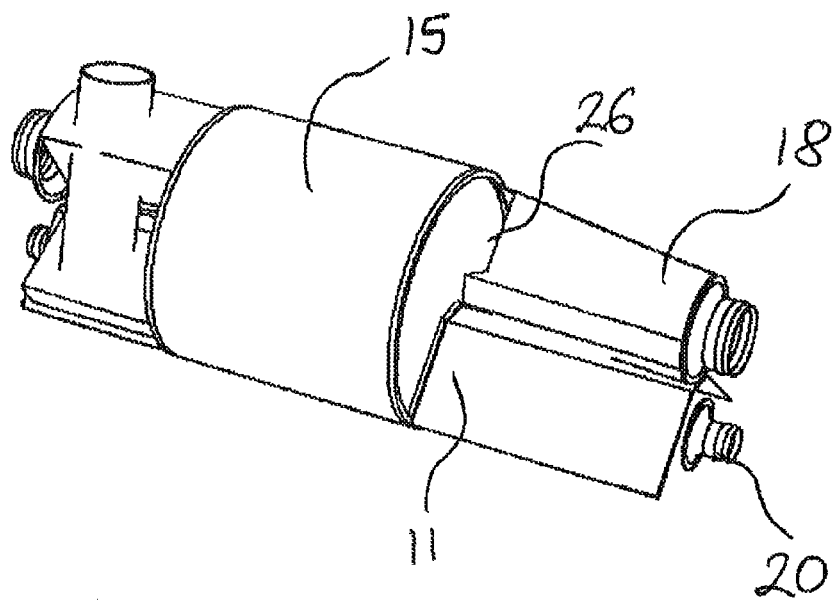
FIG. 6 shows in a perspective view a sorption drying system according to a first embodiment of the present invention.

FIGS. 4-6 show in a perspective view a sorption drying system according to a first embodiment of the present invention. Reference designations of the corresponding features in FIG. 1 and FIG. 3 have been kept. Here, the absorbent mass 1 in the form of a drying rotor is contained in a cylindrical housing 15. The housing 15 has an inlet side or inlet end portion 16 and an outlet side or outlet end portion 17. The gas stream 2 to be dehumidified or separated from another gas is directed into the drying rotor through a first, upper end portion connection 18 on the inlet side 16. The first end portion connection 18 is funnel-shaped and is shaped so that the gas stream 2 is directed inward toward an approximated circular sector-shaped area of the drying rotor. The inlet side 16 has also an outlet connection 20 for the stream of regeneration gas 3, which passes against the current through a regeneration sector 11 of the drying rotor. It is also feasible to allow the stream of regeneration gas 3 to pass the drying rotor with the current, whereupon the connection 20 then constitutes the inlet for the stream of regeneration gas 3.

The drying rotor rotates clockwise as seen from the inlet side 16. The moist air in the gas stream 2 is then roughly brought into a part of the drying rotor that is about to enter the regeneration sector 11. In this application of controlled recirculation, this has the advantage that the moist air is pre-dried, since a large concentration difference between the moist gas stream 2 and the drying rotor is utilized by using a more saturated part of the drying rotor.

On the outlet side 17, the dehumidified gas stream is received by the deflection means 4 in the form of a collection container 19. The collection container 19 covers a sector of the drying rotor that is essentially as large as, or preferably greater than, the sector that the moist gas stream 2 roughly is brought towards through the inlet connection 18, this in order to reliably capture essentially all dehumidified gas, but also to increase the amount of gas that is forwarded to the cooler 5. The amount of gas increases the cooling and decreases heating per passage through the drying rotor. The collection container 19 is placed so that the sector that is covered by the collection container 19 essentially corresponds to the inlet connection 18 for the moist gas stream. This to guarantee that deflection of the dehumidified gas stream takes place from an area on the outlet side 17 of the absorbent mass 1 that essentially corresponds to the area on the inlet side 16 of the absorbent mass 1 toward which the moist gas stream 2 is directed.

The collection container 19 may also have a second collection sector 21 arranged immediately after the regeneration sector 11, where the drying rotor is warm and thereby dries poorly and may also after steam. The outlet side 17 has also an inlet 23 for the stream of regeneration gas 3 in case a counter-current regeneration is used, and vice versa for a concurrent regeneration.

The dehumidified gas that is collected in the collection container 19 is sucked into the cooler 5 through the tube 22 by means of, for instance, a fan (not shown) that has been described above. The dehumidified gas is cooled and reintroduced on the inlet side 16 of the drying rotor by means 6 in the form of a tube 24 and a second end portion connection 25 for the cooled, dehumidified gas stream, which is separated from the first end portion connection 18 for the moist gas stream 2. As indicated above, also a part of the cooled, dehumidified gas stream may be mixed with the moist gas stream 2 via means 7 (not shown), for instance by connecting a conduit or tube from the cooler 5 or the tube 24 to the inlet connection 18. Alternatively, the cooled dehumidified gas stream may partly mingle with the moist gas stream in connection with natural pressure equalizing.

Figure 7:
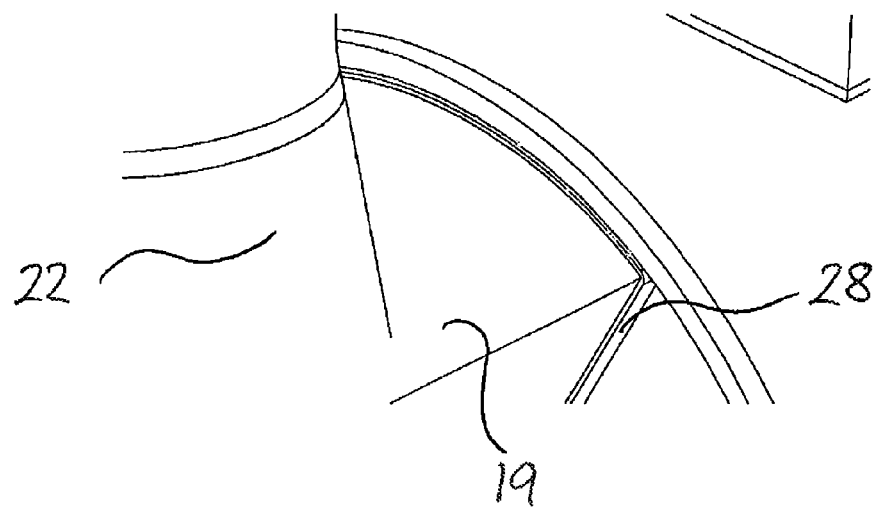
FIG. 7 shows a detail of the sorption drying system in FIG. 4.

The sectors where the first and second, respectively, end portion connection 18, 25 connects to the inlet side 16 can be separated by means of seals 28, for instance thin rubber mouldings or squeegees; FIG. 7 shows an enlarged area of the collection container 19 in FIG. 4 at its connection to the drying rotor where seal 28 is illustrated. The seals 28 are, however, not necessary for separating the cooled, dehumidified gas stream from the moist gas stream 2, since the moist gas stream is directed toward its sector and is sucked through the drying rotor by means of a fan (not shown). Another advantage of not using seals is that unbalances that arise as a consequence of pressure differences between the cooled, dehumidified gas stream and the moist gas stream 2 are levelled out. In order to further improve the pressure equalizing, gaps 26, 27 may be arranged in the first and/or second end portion connection 18, 25 for the moist gas stream and the cooled, dehumidified gas stream, respectively. In the case where seals 28 are used to eliminate or minimize leakage between the gas streams, the first and/or second end portion connection 18, 25 may be provided with openings to allow pressure equalizing.

As mentioned above, the components that connect to the drying rotor on the inlet and/or the outlet side 16, 17 may be contained in a shell or housing (not shown). Leakage losses on the inlet and/or the outlet side 16, 17 will then build up a pressure inside the housing that counteracts further leakage. Furthermore, the housing contributes to the second end portion connection 25 for the cooled dehumidified gas stream not being strictly required, but the cooled dehumidified gas stream that is returned to the inlet side 16 is directed to the area of the drying rotor that is not embraced by the first end portion connection 18 for the moist gas stream and the sector 11 of the stream of regeneration gas 3. This is illustrated in FIG. 6.

Figure 8:
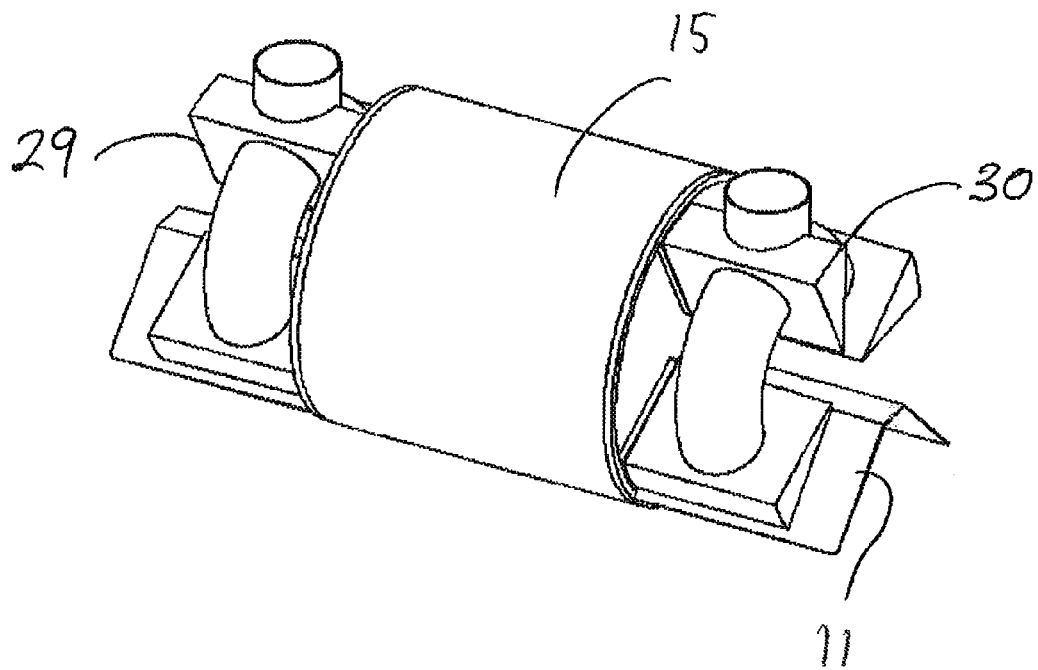
FIG. 8 shows in a perspective view a sorption drying system according to a second embodiment of the present invention.
Figure 9:
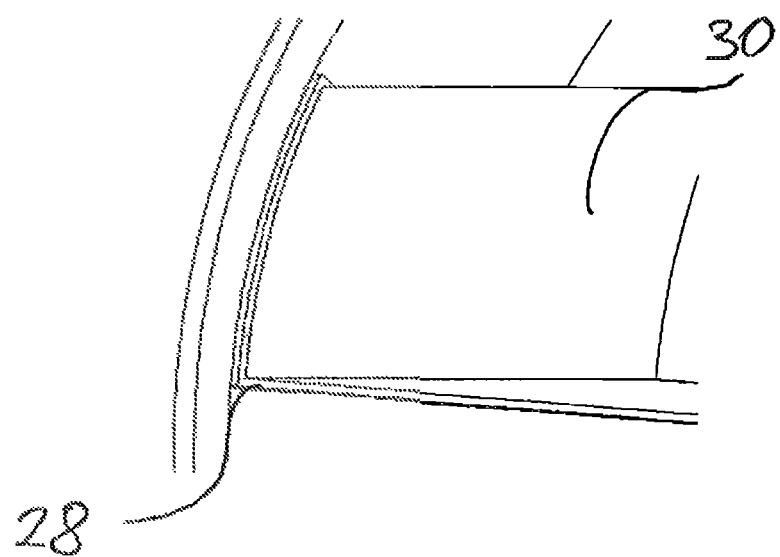
FIG. 9 shows a detail of the sorption drying system in FIG. 8.

FIG. 8 illustrates a second embodiment of a sorption drying system according to the present invention. Here, the system comprises a collection container 29 that corresponds to the collection container 19. The difference is that the collection container 29 comprises three essentially equally large sectors connected to the outlet side 17 of the drying rotor by means of seals 28 for receiving the dehumidified gas stream and directing it further to the cooler 5. The number of sectors is, however, not limited to three, but may be varied to achieve an optimal cooling of the drying rotor. After cooling, the cooled, dehumidified gas stream is directed to the inlet side 16 of the drying rotor via a returning container 30. Also the returning container 30 comprises three sectors connected to the inlet side 16 of the drying rotor by means of seals 28, which are illustrated in FIG. 9 by the enlarged area of the returning container 30 in FIG. 8.

The three sectors of the returning container 30 are arranged in essentially the same positions on the inlet side 16 as the three sectors of the collection container 29 on the outlet side 17 so that the sectors are axially aligned with each other. The moist gas stream 2 is then directed through the remaining sectors of the drying rotor, separated from the sectors of the cooled, dehumidified gas stream. This configuration allows increased flow rate of the cooled, dehumidified gas stream for efficiently cooling down the drying rotor along its revolution, which gives an improved drying performance. Another conceivable solution is that the direction of flow of the cooled dehumidified gas stream is opposite the direction of flow of the moist gas stream through the absorbent mass 1. This can be achieved by means of, for instance, fans.

The invention is of course not limited to the embodiments that are illustrated here, but may be varied within the scope of protection that is defined by the claims.

The invention claimed is:

1. A sorption drying system for dehumidification of a humid gas stream, said system comprising:
   a mass of absorbing material in the form of a drying rotor contained and adapted to rotate about a central axis, wherein the drying rotor has an inlet side and an outlet side;
   a first end portion connection arranged on the inlet side of the drying rotor to direct a humid gas stream into the drying rotor, wherein the first end portion connection is shaped so that the humid gas stream is directed inward toward a substantially circular sector-shaped area of the drying rotor, such that the humid gas stream is arranged to flow through a part of the drying rotor corresponding to the sector defined by the first end portion connection and be dehumidified;
   a heated stream of regeneration gas arranged to flow through a regeneration sector of the drying rotor essentially having the shape of a circular sector, wherein the regeneration sector is separated from the sector defined by the first end portion connection by means of seals;
   a collection container arranged on the outlet side of the drying rotor to cover a sector of the drying rotor that is essentially as large as the sector defined by the first end portion connection and deflect a dehumidified gas stream from the outlet side of the drying rotor, wherein the collection container is placed so that the sector covered by the collection container essentially corresponds to the sector defined by the first end portion connection on the inlet side of the drying rotor toward which the humid gas stream is directed;
   a cooler for cooling the deflected dehumidified gas stream; and
   a second end portion connection arranged on the inlet side of the drying rotor separate from the first end portion connection for the humid gas stream for returning the cooled deflected dehumidified gas stream to the inlet side of the drying rotor,
   wherein the sector defined by the first end portion connection is situated essentially immediately before the regeneration sector in the direction of rotation of the drying rotor, and
   wherein the cooled deflected dehumidified gas stream is arranged to flow through the drying rotor in a second sector defined by the second end portion connection and separated from the sector defined by the first end portion connection and containing the humid gas stream.

2. The sorption drying system according to claim 1, further comprising a fan situated between the collection container and the cooler.

3. The sorption drying system according to claim 1, wherein the collection container comprises a second collection sector arranged immediately after the regeneration sector.

4. The sorption drying system according to claim 1, further comprising a valve situated at an inlet connection or outlet connection for the stream of regeneration gas for regulating the pressure of the stream of regeneration gas.

5. The sorption drying system according to claim 4, further comprising a fan for varying the flow of the stream of regeneration gas through the drying rotor.

6. The sorption drying system according to claim 1, further comprising a valve situated at the inlet side or outlet side of the drying rotor for the humid gas stream for regulating the pressure of the humid gas stream.

7. The sorption drying system according to claim 4, further comprising a fan for varying the flow of the humid gas stream through the drying rotor.

8. The sorption drying system according to claim 1, wherein the parts of the drying system that comprise the drying rotor and the seals are built-in in an air-proof housing.

9. A method for dehumidification of a gas stream in a sorption drying system comprising a mass of absorbing material in the form of a drying rotor and adapted to rotate about a central axis, wherein the drying rotor has an inlet side and an outlet side, wherein the method comprises the steps of:
   directing a humid gas stream into the drying rotor through a first end portion connection arranged on the inlet side of the drying rotor, wherein the first end portion connection is shaped so that the humid gas stream is directed inward toward a substantially circular sector-shaped area of the drying rotor, such that the humid gas stream flows through a part of the drying rotor corresponding to the sector defined by the first end portion connection and is dehumidified;
   directing a heated stream of regeneration gas through a regeneration sector of the drying rotor essentially having the shape of a circular sector, wherein the regeneration sector is separated from the sector defined by the first end portion connection by means of seals;
   deflecting the dehumidified gas stream from the outlet side of the drying rotor by means of a collection container arranged on the outlet side of the drying rotor to cover a sector of the drying rotor that is essentially as large as the sector defined by the first end portion connection, wherein the collection container is placed so that the sector covered by the collection container essentially corresponds to the sector defined by the first end portion connection on the inlet side of the drying rotor toward which the humid gas stream is directed;
   cooling the deflected dehumidified gas stream in a cooler; and
   returning the cooled deflected dehumidified gas stream to the inlet side of the drying rotor by means of a second end portion connection arranged on the inlet side of the drying rotor separate from the first end portion connection for the humid gas stream,
      wherein the sector defined by the first end portion connection is situated essentially immediately before the regeneration sector in the direction of rotation of the drying rotor and wherein the method further comprises the step of:
   directing the cooled deflected dehumidified gas stream through the drying rotor in a second sector defined by the second end portion connection and separated from the sector defined by the first end portion connection and containing the humid gas stream.

10. The method according to claim 9, further comprising the step of regulating the pressure of the stream of regeneration gas and/or the humid gas stream in such a way that the pressure of the stream of regeneration gas is essentially equal to, however always lower than, the pressure of the humid gas stream.

\* \* \* \* \*